April 1, 1947. H. SAX ET AL 2,418,279
WHEEL BLOCKING DEVICE
Filed Nov. 19, 1945

INVENTORS:
HERMAN SAX
LEROY J. FOX
BY *Stevens + Batchelor*
ATTORNEYS.

Patented Apr. 1, 1947

2,418,279

UNITED STATES PATENT OFFICE 2,418,279

WHEEL BLOCKING DEVICE

Herman Sax and Leroy J. Fox, Chicago, Ill., assignors to Modern Devices, Inc., Chicago, Ill., a corporation of Illinois Application November 19, 1945, Serial No. 629,520

2 Claims. (Cl. 188—32)

Our invention relates to devices which are applicable to a motor car wheel to lock the same from rolling while a tire is being changed with the aid of a bumper jack. Often a car raised by such a jack—and therefore pivoted on a single post—is insecurely poised and easily subject to falling and rolling, particularly when the road is sloping or crowned.

While blocking devices—sometimes called chocks—have been designed in one form or another to lock cars against rolling in instances of the character mentioned, it is one object of the present invention to provide a device which is readily applicable and easily adjustable to wheels of different conventional sizes.

Another object is to design the novel blocking device along lines of simplicity, ruggedness and compactness, in order that it may be cheaply produced, roughly handled, and carried along with tools or other accessories in the luggage compartment of the car.

With the above objects in view and any others which may suggest themselves from the description to follow, a better understanding of the invention may be had by reference to the accompanying drawing, in which—

Figure 1:
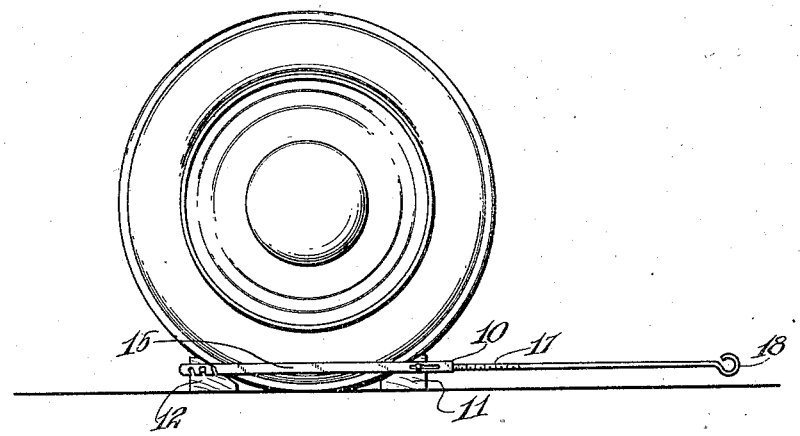
Fig. 1 is a side elevation of the device, showing a motor car wheel blocked therein.

In accordance with the foregoing, specific reference to the drawing shows the device to be mainly in the form of a U-shaped frame 10, the material thereof being sturdy strap iron stock.

Two beveled wood blocks 11 and 12 are designed to be transversely positioned in the frame 10, the bevels of the blocks facing each other. The block 11 is located in the inner portion of the frame and is slidable longitudinally thereof through the agency of a pair of screws 13. These pass freely through longitudinal slots 14 in the side bars 15 of the frame and are driven into the sides of the block as indicated at 16. The sliding of the block is induced by threading a screw 17 through the inner end of the frame. The outer end of the screw is in the form of an eye 18, while the inner end thereof turns freely in a retainer 19 embedded in the outer end of the block.

The block 12 also receives a pair of screws 20 from the side, but the shanks of these are designed to enter a selected pair of oblique slots 21 forming part of a series cut from the bottom in the free end portions of the side bars 15.

Figure 2:
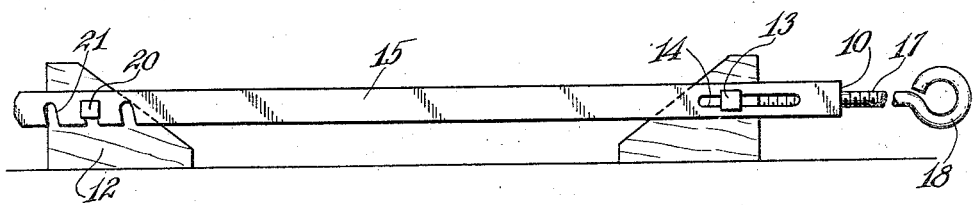
Fig. 2 is an enlarged duplication of the device alone.
Figure 3:
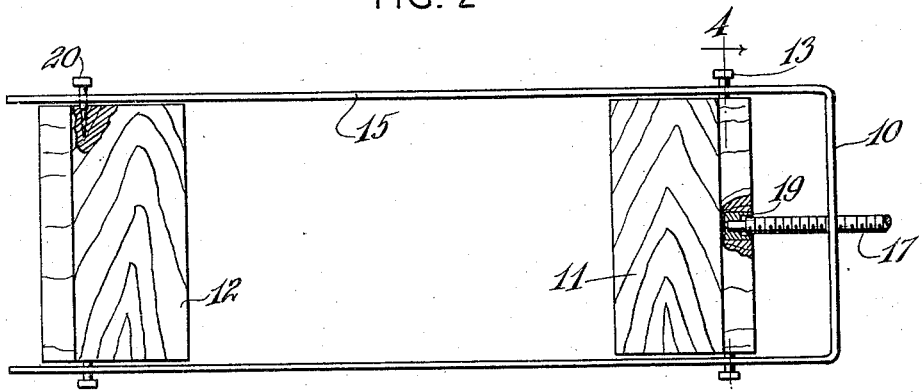
Fig. 3 is a top plan view.
Figure 4:
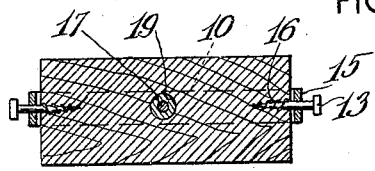
Fig. 4 is a section on the line 4—4 of Fig. 3.

When the device is to be applied to block up a motor car wheel, the block 12 is first removed, in order that the corresponding end of the frame 10 may be open. The frame is now slid on the ground to receive the bottom portion of the inflated wheel tire between the frame side bars 15. The leading ends of these are now raised and the block 12 inserted to the position of Fig. 2, the nearest pair of slots 21 being chosen to receive the screws 20 according to the size of the tire. The number and positions of the slots are calculated to suit the most popular or common tire sizes. With the wheel positioned between the blocks 11 and 12, the screw 17 is rotated to advance the block 11 until it bears firmly on the wheel tire, causing the wheel to be firmly clamped or blocked-in between the blocks 11 and 12. It is now impossible for the wheel to roll, and the motor car will hold its place while the jack is in the lifting, standing or lowering positions.

It will be evident from the above description that the blocks 11 and 12 are employed in a novel arrangement. Thus, the frame 10 is of the simplest and most suitable form for application to the bottom portion of the wheel, being closed where the permanent block 11 occurs and open where the removable one is applicable. After the block 12 has been engaged to locate both blocks closely adjacent to the inflated wheel tire, the eye 18 is in a handy position to be rotated until the blocks secure a good clamping grip on the wheel, the screw forming a centered control to apply the block 11 evenly. Further, the parts making up the device are few and simple; and the entire device is sufficiently light and compact to be handled with ease and kept with other tools or accessories in the luggage compartment of the car.

While we have described the invention along specific lines, various minor changes or refinements may be made therein without departing from its principle, and we desire to consider such changes and refinements as coming within the scope and spirit of the appended claims.

We claim:

1. A wheel blocking device comprising a U-shaped frame adapted to be placed over the wheel to be blocked, a block slidably guided by the frame longitudinally thereof, an operating screw threadedly engaging the bight portion of said frame and rotatably engaging said block, another block adjustable in said frame, pairs of oblique notches in the legs of said frame and directed toward the bight part thereof and opening through one side thereof, screws threaded in the sides of said other block and adapted for insertion into a corresponding pair of said notches to hold said other block in a selected position.

2. A wheel blocking device comprising a U-shaped frame adapted to be placed over the wheel to be blocked, a block slidably guided by the frame longitudinally thereof, an operating screw threadedly engaging the bight portion of said frame, a retainer rotatably connecting said screw to said block, another block adjustable in said frame, pairs of oblique notches in the legs of said frame and directed toward the bight part thereof and opening through one side thereof, screws threaded in the sides of said other block and adapted for insertion into a corresponding pair of said notches to hold said other block in a selected position.

HERMAN SAX.
LEROY J. FOX.

REFERENCES CITED

The following references are of record in the file of this patent:

UNITED STATES PATENTS

| Number | Name | Date |
| --- | --- | --- |
| 472,997 | Hayward | Apr. 19, 1892 |

FOREIGN PATENTS

| Number | Country | Date |
| --- | --- | --- |
| 1,066 | British | Jan. 15, 1896 |
| 355,872 | German | July 8, 1922 |
| 452,251 | French | May 13, 1913 |